Figure 4:
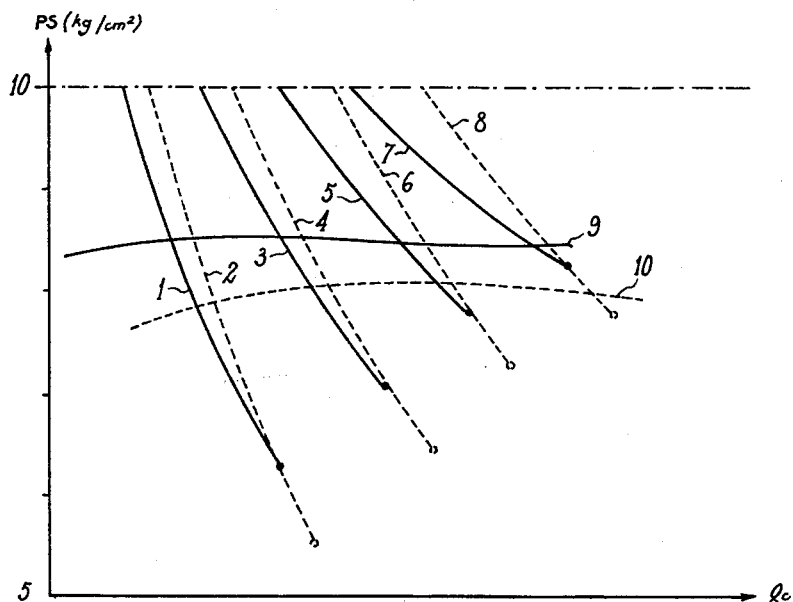

Dec. 29, 1964   JEAN-PHILIPPE MORNAS   3,163,329
METHOD FOR CONTROLLING THE FLOW OF SOLID
PULVERULENT SUBSTANCES
Filed Sept. 10, 1962   7 Sheets-Sheet 1
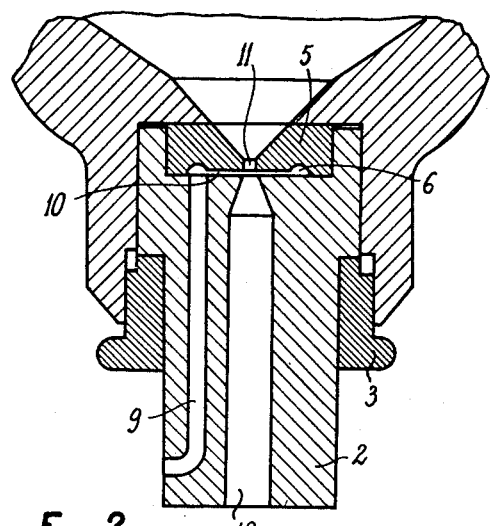
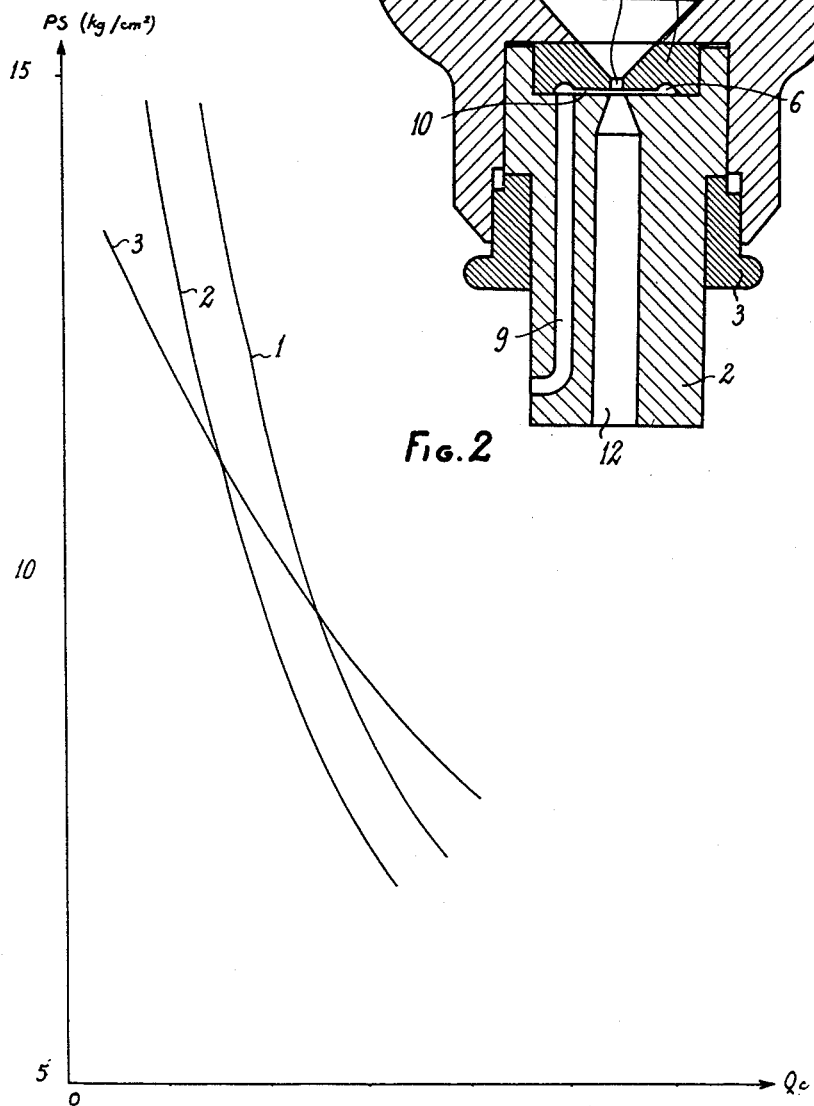
Inventor
Jean-Philippe Mornas
By
Wenderoth, Lind & Ponack
Attorneys

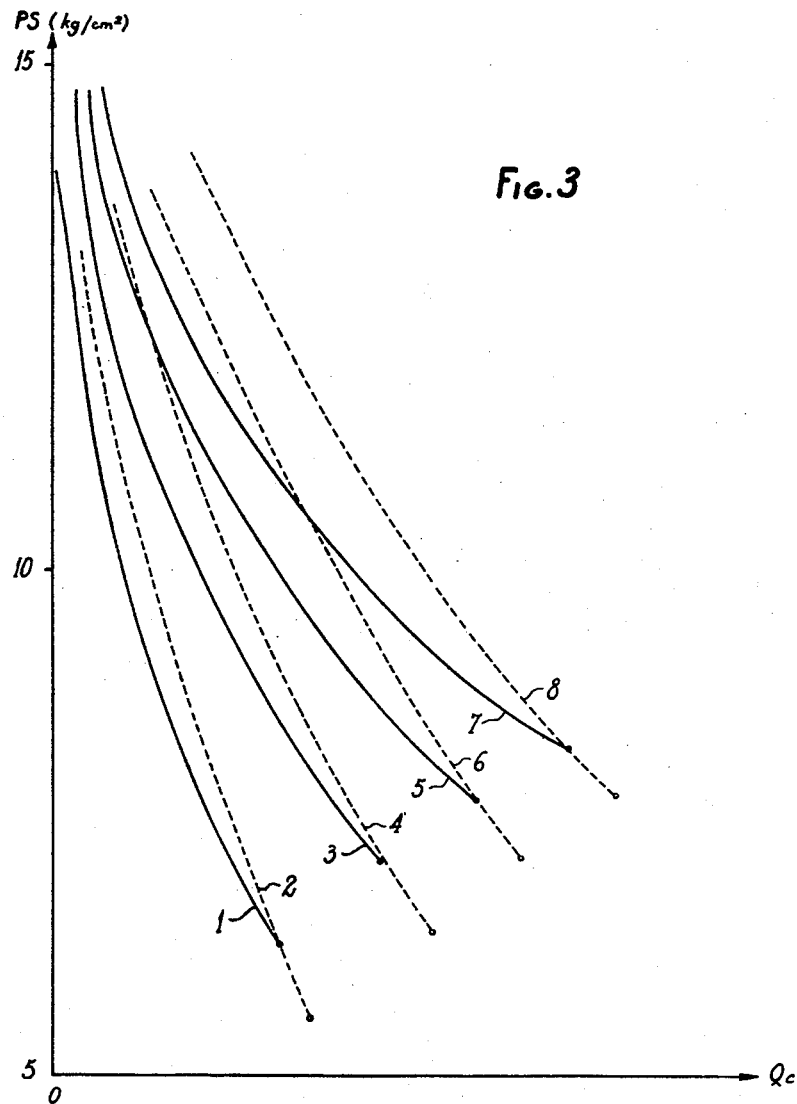

Dec. 29, 1964   JEAN-PHILIPPE MORNAS   3,163,329
METHOD FOR CONTROLLING THE FLOW OF SOLID
PULVERULENT SUBSTANCES
Filed Sept. 10, 1962   7 Sheets-Sheet 3

Inventor
Jean-Philippe Mornas
By
Wenderoth, Lind & Ponack
Attorneys $P_3 = aP_2 + bQ_c + c$ Inventor
Jean-Philippe Mornas
By Wenderoth, Lind & Ponack
Attorneys

3,163,329
METHOD FOR CONTROLLING THE FLOW OF SOLID PULVERULENT SUBSTANCES

Jean-Philippe Mornas, St. Etienne, France, assignor to Compagnie des Ateliers et Forges de la Loire (St. Chamond, Firminy, St. Etienne, Jacob-Holtzer), Paris, France
Filed Sept. 10, 1962, Ser. No. 222,556
Claims priority, application France, Sept. 9, 1961, 872,793, Patent 1,325,617
1 Claim. (Cl. 222—1)

This invention relates to a method for controlling the flow rate of pulverulent materials in suspension in a fluid, generally a gas.

Various processes and apparatus are known which permit:

(1) The bringing into suspension of a pulverulent product in a gaseous stream in an apparatus that may be termed a static powder distributor, (2) The permanent measurement of the mass flow rate of the pulverulent product, and (3) The regulating of this rate to any value chosen between suitable limits.

It is also known to regulate the flow of the pulverulent product by employing a valve with a pneumatically variable orifice. In this method which may be referred to as "pneumatic striction" a fraction of the flow of transporting gas is diverted from the main flow to the valve seating in order to produce the variation of said orifice.

It is an object of the present invention to provide an improved method for controlling the flow rate of pulverulent materials in suspension in a fluid when employing a valve having a pneumatically controlled orifice.

According to the present invention there is provided a method for controlling the flow of pulverulent material from a gas pressurised distributor therefor through a valve comprising a pneumatically variable orifice into a gas stream at an injection location comprising deriving a signal representing the gas pressure within the distributor, controlling said gas pressure in accordance with a comparison between said signal and a control signal and controlling an auxiliary gas flow to said valve from the gas stream at a second location upstream of said injection location in accordance with a characteristic of the gas stream at a position adjacent said injection location.

Several embodiments of the invention will now be described with reference to the accompanying drawings in which:

FIG. 1 shows, in longitudinal section, a valve of known type having a pneumatically variable orifice, FIGS. 2, 3, 4, 5, 8 and 10 are curves showing various operating characteristics of the valve of FIG. 1 and FIGS. 6, 7, 9 and 11 show, diagrammatically several practical forms of apparatus operable according to the invention.

Referring to FIG. 1, this shows the lower end of a static powder distributor or hopper incorporating a valve block 2 held in place by a ring 3. The upper end of the block 2 is recessed and an annular striction seating 5 is disposed therein. The lower surface of the seating 5 is formed with an annular depression defining, with the block 2, a gap 10. This depression is bounded by a circular groove 6 communicating with the upper end of an auxiliary gas passage 9 in the block 2. The latter has a central outlet passage 12 registering with the orifice 11 in the seating 5 which orifice constitutes an outlet for the static powder distributor or hopper.

The valve described above is known and in operation auxiliary gas passing through the passage 9 converges over the entire circumference of the outlet orifice 11. By varying the flow of the auxiliary gas it is possible to influence the flow of powder emerging from the distributor through the orifice 11 and finally through the outlet passage 12.

In considering the principal operating characteristics of such a valve reference will now be made to FIGS. 2, 3, 4 and 5 and in the following description, the term "seating diameter" is to be understood as the diameter of the orifice 11 (FIG. 1) and the term "gap thickness" is to be understood as the distance left free between the block 2 and the seating (FIG. 1) forming the gap marked 10.

FIG. 3 shows curves indicating the static pressure $P_s$ prevailing in the pipe line supplying the seating 5 plotted against the mass flow rate $Q_c$ of the pulverulent product for different values of the pressure $P_3$ (termed the higher pressure) prevailing within the powder distributor and of the flow of the transporting gas. In FIG. 3, the values of $P_3$ are as follows Curves:
| | |
|---|---|
| 1–2 | $P_3 = 7$ kg./cm.$^2$ |
| 3–4 | $P_3 = 8$ kg./cm.$^2$ |
| 5–6 | $P_3 = 9$ kg./cm.$^2$ |
| 7–8 | $P_3 = 10$ kg./cm.$^2$ |

The expression Nm.$^3$ signifies "normal cubic meters per minute." A normal cubic meter of gas is defined as a cubic meter at normal pressure and temperature, or at the standard conditions at 0° centigrade and 760 mm. pressure, as defined on page 2181, Handbook of Chemistry and Physics, 26th edition, 1942–1943, published by the Chemical Rubber Publishing Co., 2310 Superior Avenue, Cleveland, Ohio.

The flow rate of transporting gas for curves 1–3–5–7 is 120 Nm.$^3$/min. and for curves 2–4–6–8 is 100 Nm.$^3$/min.

The dots at the lower ends of all the curves correspond to the points where the flow $Q_s$ of auxiliary gas to the seating 5 equals 0.

FIG. 2 shows curves giving the pressure $P_s$ as a function of the flow $Q_c$, for the same higher pressure $P_3$, the same flow of transporting gas, but different geometric features of the seating. In FIG. 2 the curves 1–2 correspond to a seating diameter $D_1$, and curve 3 corresponds to a seating diameter $D_2$, which is greater than $D_1$. Curve 1 corresponds to a gap thickness of $e_1$ and curves 2–3 to a gap thickness of $e_2$ which is greater than $e_1$. The lower ends of each curve correspond to the points where the flow $Q_s$ of auxiliary gas to the seating 5 equals 0.

Figure 5:
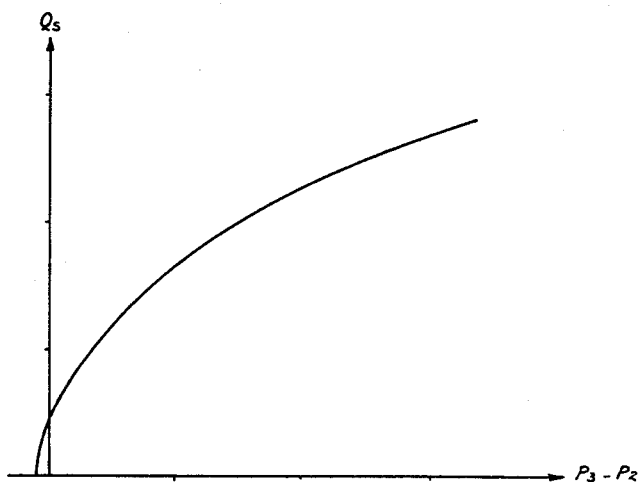

FIG. 5 is a graph illustrating approximately and schematically the flow of $Q_s$ of auxiliary gas supplying the seating 5 as a function of the difference $P_3 - P_2$, between the supply pressure for the seating, and $P_2$ the pressure prevailing in the transport pipe line upstream of the injection of the pulverulent product.

It will here be appreciated that the installation will generally include suitable regulators for controlling the flows of transporting gas as well as of pulverulent product brought into suspension in this gas. In the regulating methods known heretofore, it was believed that the value of the higher pressure $P_3$ should be kept at a constant value generally by manual control.

From FIGS. 2 and 3, it will be understood that such an operation will only be rarely satisfactory. The range of regulation of flow of the pulverulent product will for example impose the simultaneous choice of the following conditions:

(1) An orifice diameter for the seating much greater than that which would be appropriate with a regulation of the flow by variation of the higher pressure, (2) A large gap thickness, in order that the range of regulation may be covered, (3) A large higher pressure.

These conditions are moreover interdependent upon each other.

However fortunate the choice of these parameters has been the maximum value of the pressure $P_s$ needs to be high in order to enable the minimum flow of the pulverulent product to be ensured and as shown in FIG. 5, the maximum value of the auxiliary gas flow supplying the seating also needs to be high.

This presents considerable difficulties for example, the necessity of having a high pressure available for the transporting gas and the serious risks of reaction between the regulators controlling the flow of transporting gas and the flow of the pulverulent product which may make itself felt by the appearance of a permanent oscillatory condition.

The present invention enables the pressure $P_s$, and the flow $Q_s$ to be maintained at moderate values compatible with the characteristics of the distributing network for the transporting gas and with the performance normally realizable with regulators. This result is obtained by automatic regulation of the regulation $P_3$, the flow of the pulverulent product nevertheless always remaining regulated and controlled by "pneumatic striction."

In accordance with a first feature of the invention, the pressure $P_3$ known as the higher pressure, prevailing at the interior of the powder distributor is made equal to a set point value by an otherwise orthodox system of regulator and automatic charging and discharging valves.

In accordance with a second feature of the invention, this set point value which may be represented by any kind of signal, is developed and supplied to the above follow-up system. This value is developed by a suitable apparatus from the measurement of certain magnitudes (which will be dealt with later) or directly from the predetermine value provided, in turn to the follow-up systems (if any) of these magnitudes.

The magnitudes serving as data for the development of this derived predetermined value of higher pressure, are as follows:

The flow rate of the pulverulent product and/or the flow rate of the transporting gas, or again possibly all magnitudes whose measurements are functions of one and/or the other of these two deliveries are controlled. Such magnitude for example will be the transport pressure whose value is a function of the flow of gas and of the flow of powder.

In conformity with a third feature of the invention, this record is such that either the delivery $Q_s$ derived by striction, or the pressure $P_s$ at which this delivery flows, is kept constant or approximately constant, or again it is such that one of these two magnitudes, $P_s$ or $Q_s$, or even both of them are comprised between two given limits, over the entire expanse of the normal regulating ranges of the outputs of pulverulent product and transporting gas.

Figure 6:
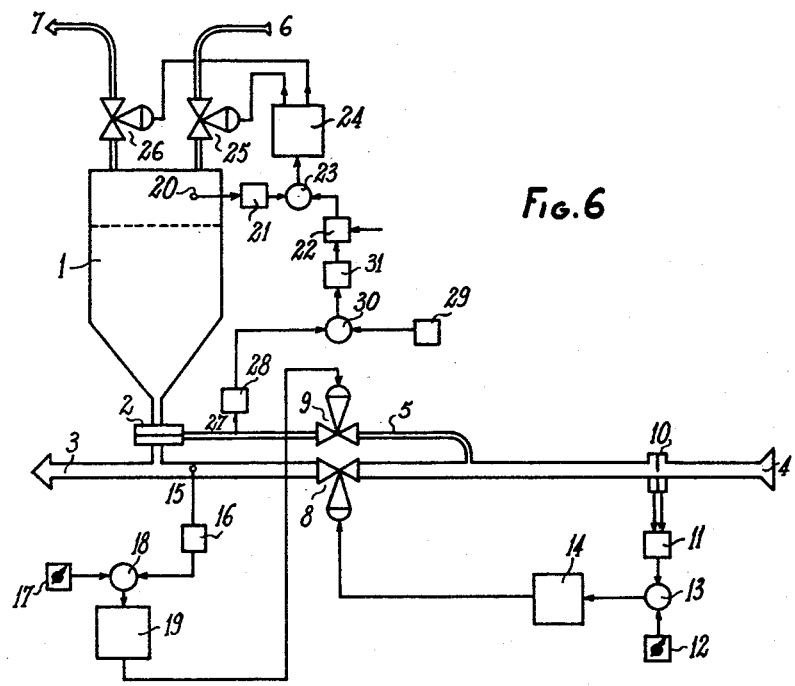

A first embodiment of the invention is illustrated schematically in FIG. 6, in which a static powder distributer 1 has an outlet valve 2 incorporating a seating with a pneumatically controllable orifice (pneumatic striction). The outlet of the valve 2 is joined to a pipe line 3 for conveying the solid in suspension from the distributor 1 in a gaseous stream from a source 4. A branch pipe 5 supplies auxiliary gas to the pneumatic striction seating of the valve 2 and a pipe line 6 supplies gas for bringing the powder distributor under pressure. A drainage line 7 is provided for the distributor and 8 and 9 indicate regulator valves for the main gas flow in the pipe line 3 and the striction flow in the branch pipe 5.

A flowmeter 10 which may be of the diaphragm type indicates the rate of flow of gas in the pipe line 3 and is coupled with an information corrector/converter 11 delivering a signal representing the rate of gas flow in the pipe line 3. A manually settable device 12 delivers a signal representing the predetermined rate of gas flow. This signal together with the signal from the corrector/converter 11 is supplied to a comparator 13 delivering at its output an error signal which is a suitable function of the difference between the two signals supplied by the devices 11 and 12. The comparator 13 controls a regulator 14 which in turn controls the regulating valve 8.

The determination of the pressure $P_2$ existing in the pipe line 3 upstream of the position at which the pulverulent material is injected therein and the control of the flow of auxiliary gas in the seating 5 by the passage 9 in order to regulate the mass flow of the pulverulent product is effected by devices 15, 16, 17, 18 and 19, the reference 15 designating a pressure sensing element and the references 16, 17, 18 and 19 designating elements similar to those indicated at 11, 12, 13 and 14 above.

The higher pressure $P_3$ is measured by a gauge 20 coupled to an information corrector/converter 21 supplying a comparator 23 in conjunction with a device 22 supplying a control signal. The comparator 23 supplies an error signal to a regulator 24 which controls charging and discharging valves, 25 and 26 respectively, for the gas applying pressure to the powder distributor 1.

Further, the striction pressure $P_s$ is measured at 27 and 28, then compared at 30 with a predetermined value delivered by a device 29, this value being generally regulated only once when the installation is set up. This is however not imperative and it is possible to modify the predetermined value automatically by the measurement of any other suitable parameter, such as for example the pressure in the pipe line 3 upstream of the flowmeter 10.

The comparator 30 supplies an error signal to a regulator 31 which in turn controls the device 22 supplying a control signal to the comparator 23.

It is desirable that the higher pressure $P_3$ be controlled in such a way, that the pressure $P_s$ supplying the variable orifice seating is kept in the region of a suitable value, chosen in advance.

By way of modification, $P_3$ may be controlled so as to keep constant the delivery $Q_s$ supplying the variable orifice seating, instead of the value $P_s$. For this purpose a flowmeter may be substituted for the pressure gauge at 27 and 28.

This embodiment of the invention has the advantage that it ensures a limitation of the pressure $P_s$, and consequently it is possible to provide an installation in which the pressure necessary at the source need only be slightly higher than the maximum value required for the transporting pressure.

On the other hand, it has the disadvantage of having a closed chain control system the stability of which must therefore be carefully studied. This chain is formed by the following elements: the gauge measuring $P_s$, the comparator 30, the regulator 31, the device 22, the regulator 24, the pressure gauge 20, the element 15, the devices 16, 18 and 19 and finally the regulating valve 9, which reacts in its turn on $P_s$.

In the following example, the pressure $P_s$ will only be kept approximately constant.

If the curves for different pneumatic striction seatings is plotted for $P_s$ as a function of $Q_c$, but with a constant value for the difference $P_3 - P_2$ ($P_2$ being the transporting pressure), instead of a constant value for the higher pressure $P_3$, it is found that with a judicious choice of the geometric characteristics of the seating, there then exists a pressure-difference value $P_3 - P_2$ for which the "stricture pressure" only varies very little as a function of the powder flow, at a constant delivery of transporting gas. This result will be apparent from FIG. 4 in which are plotted on the one hand the characteristics at constant higher pressure, and on the other hand those at constant differential pressure $P_3 - P_2$. The curve 9 corresponds to a delivery of transporting gas of 120 Nm.³/min. and $P_3-P_2=1.5$ kg./cm.². The curve 10 corresponds to a delivery of transporting gas of 100 Nm.³/min. and $P_3-P_2=2$ kg./cm.².

Figure 7:
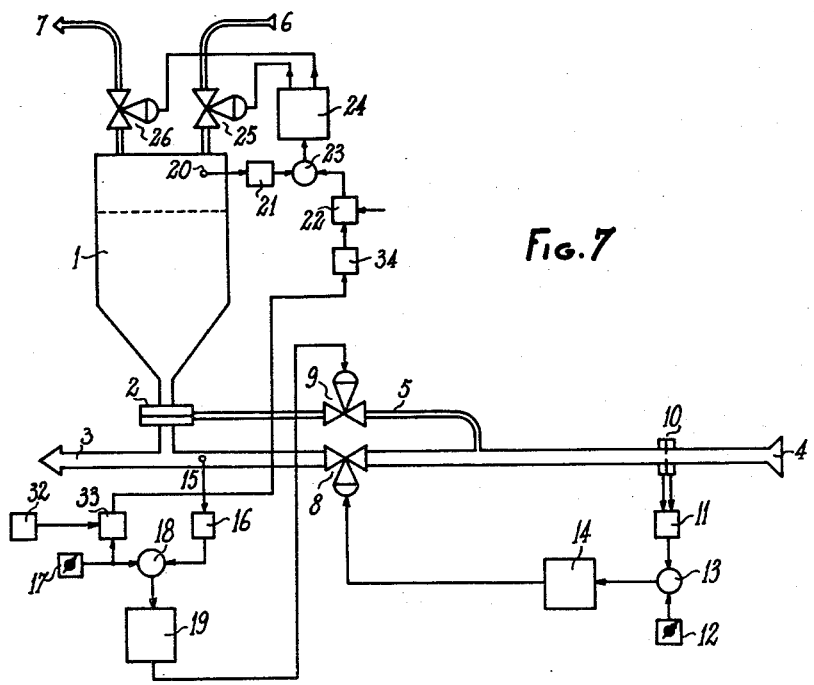

From this, a second embodiment has been derived which is schematically illustrated in FIG. 7 in which the reference numerals 1 to 26 have the same significance as in FIG. 6.

The output signal from the manually settable device 17 is additionally provided to an adder 33, the output of which is a signal proportional to the sum of the outputs of the device 17 and a device 32 comprising any apparatus fixing the desired value $P_3-P_2$. The device 32 could possibly be controlled by any magnitude deemed suitable, for example the rate of flow of transporting gas.

The output from the adder 33 is supplied directly to a regulator 34 for the device 22. It is to be understood however that the devices 34 and 22 could be omitted if the output signals of the adder 33 and those necessary for the comparator 23 are of the same nature. Similarly the adder 33 may be connected to the corrector/converter 16, or alternatively the adder may be omitted and the gauge 20 may be replaced by a gauge measuring the differential pressure $P_3-P_2$. The device 22 would then fix the value of this differential pressure and the elements 32 and 34 could also be omitted.

The arrangement of FIG. 7 has the advantage of completely separating the higher pressure regulation chain from the other regulation chains. Thus it is easy to bring into adjustment such an arrangement. It also has the advantage of permitting control of very slight deliveries of powder (see FIG. 4). On the other hand it demands a carefully adapted choice of the characteristics of the seating, and sometimes requires a relatively high value for the maximum possible striction pressure.

More generally, the higher pressure $P_3$ may be subject to any function whatever of the values of the gas and solid deliveries, or to the values of the gas delivery and the transport pressure, this function being determined in such a way as to keep constant, either the striction pressure, or the striction flow, or again to establish a favourable compromise between the extreme values of these magnitudes, when the operational regime is established.

Figure 8:
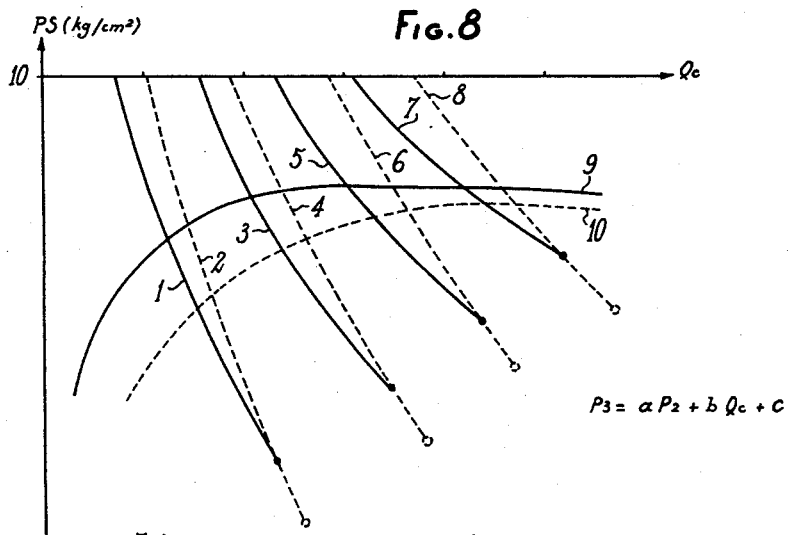

Thus for example the most simple possible function may be chosen and FIG. 8 will be found to illustrate the characteristic curves of $Ps$ as a function of $Qc$, obtained when $P_3$ is a certain separate linear function of the two following variables: transport pressure and delivery of transporting gas, the parameters of this function being so chosen that the values of the maximum and of the pressure and of the striction flow are all moderated at the same time. The curve 9 corresponds to a transporting gas delivery of 120 Nm.³/min. and curve 10 to a delivery of 100 Nm.³/min.

Figure 9:
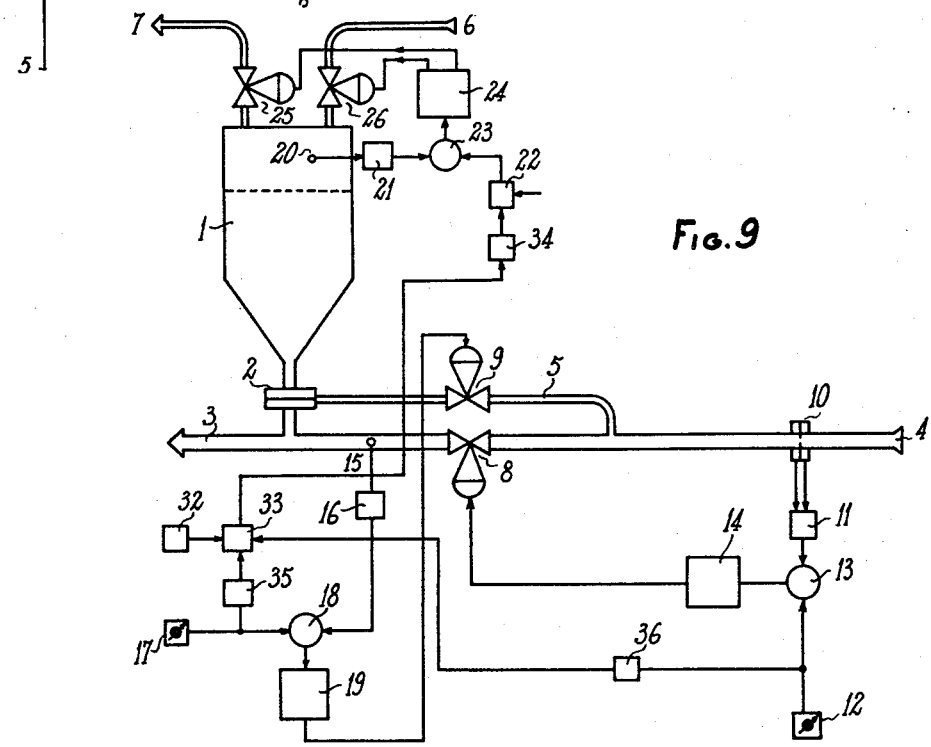

An embodiment derived from such a specific application of the invention has been schematically illustrated in FIG. 9 in which in addition to the elements already indicated in FIG. 7, there are also included the devices 35 and 36 which have the function of multiplying the signal delivered by the devices 12 and 17 by a constant. In this case the adder 33 will have three inputs instead of the two indicated in FIG. 7.

It may be established that the higher pressure $P_3$ is now equal to the sum of three terms:

A constant term regulated by the device 32,
A term proportional to the delivery of transporting gas, the coefficient of proportionality being regulated by the device 36 and A term proportional to the transport pressure, the coefficient of proportionality being regulated by the device 35.

Finally, certain specific embodiments of the regulation of mass flow of the pulverulent product provide a display of the effective value of the delivery of transporting gas and not of the transport pressure.

Figure 10:
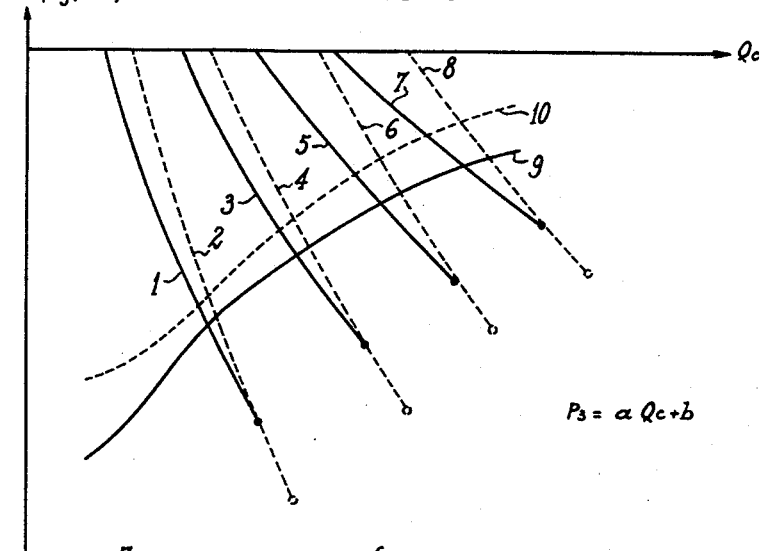

FIG. 10 is a graph indicating the value of the striction pressure as a function of the delivery $Qc$ when the higher pressure is a linear function of the effective value of the mass flow of powder, and independent of the gas delivery. Curve 9 corresponds to a delivery of transporting gas of 120 Nm.³/min. and curve 10 to a gas delivery of 100 Nm.³/min.

Figure 11:
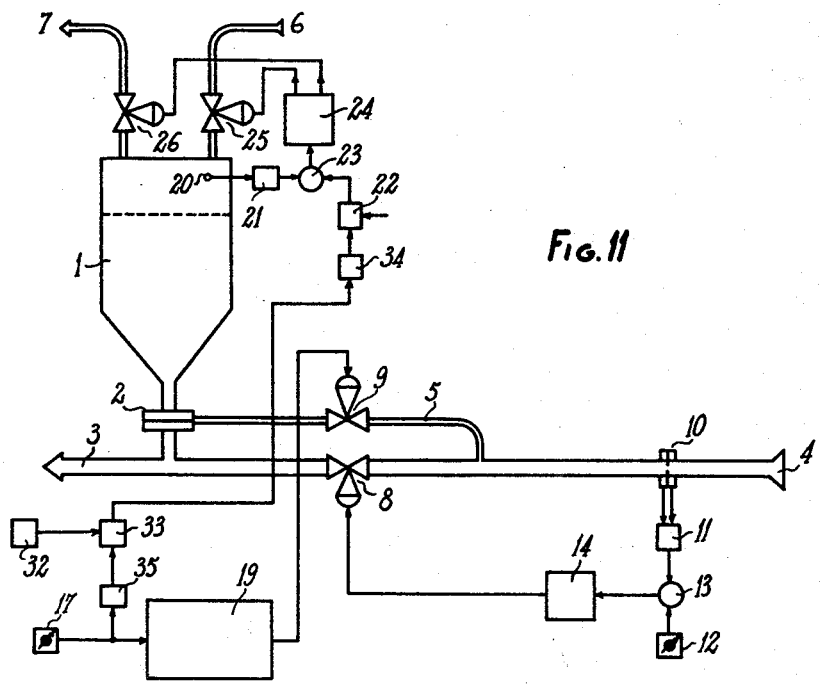

The schematic lay-out of such an embodiment is given in FIG. 11, in which 17 is a device for indicating a desired value for the mass flow of powder and 19 is an apparatus for regulating this flow, while the other reference numerals have the same significance as above.

It will be apparent that in all the arrangements described above the higher pressure is controlled in such a way that the striction pressure or the striction flow remains substantially constant, when the operational regime is established, that is without taking into account transitory variations or static fluctuations of these magnitudes, or again these values remain upwardly limited, and this possibly within the sole normal control range of the solid and gaseous deliveries.

I claim:

A method for controlling the flow rate of pulverulent material from a gas pressurized distributor therefor through a valve comprising a pneumatically variable orifice into a gas stream at an injection location comprising deriving a signal representing the pressure in the reservoir, deriving a second signal representing the pressure at the injection point, deriving a third signal representing the flow rate of gas at a second location upstream of the injection point, deriving a fourth signal representing the predetermined value of the difference between the pressure in said reservoir and the pressure at the injection point, the sum of said second, third and fourth signals constituting a control signal, comparing said first signal and said control signal, controlling the gas pressure in the reservoir as a result of said comparison, deriving a fifth signal representing a predetermined gas flow rate, deriving a sixth signal representing the actual flow rate at a location upstream of said second location, comparing said fifth and sixth signals, and controlling the flow rate at a location between said injection location and said second location in response to said second mentioned comparison.

References Cited in the file of this patent

UNITED STATES PATENTS

| | | |
|---|---|---|
| 1,271,107 | Weller | July 2, 1918 |
| 1,873,992 | Boag | Aug. 30, 1932 |
| 2,190,357 | Ginter | Feb. 13, 1940 |
| 2,454,929 | Kempton | Nov. 30, 1948 |
| 2,636,642 | Gorin | Apr. 28, 1953 |
| 2,788,719 | Bennet | Apr. 16, 1957 |
| 3,039,655 | Pfeuffer | June 19, 1962 |
| 3,111,243 | De Saint Martin | Nov. 19, 1963 |

FOREIGN PATENTS

| | | |
|---|---|---|
| 206,079 | Australia | Mar. 10, 1955 |
| 1,235,390 | France | May 30, 1960 |